US011887429B2

(12) United States Patent
Lamb et al.

(10) Patent No.: US 11,887,429 B2
(45) Date of Patent: Jan. 30, 2024

(54) GAMING MACHINE INCLUDING BRUSHLESS MOTOR SYSTEM

(71) Applicant: Aristocrat Technologies Australia Pty Limited, North Ryde (AU)

(72) Inventors: William Lamb, Eagleville, TN (US); Thach Du, Brentwood, TN (US); Charles A. Liter, Spring Hill, TN (US)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 24 days.

(21) Appl. No.: 17/860,331

(22) Filed: Jul. 8, 2022

(65) Prior Publication Data

US 2022/0343720 A1 Oct. 27, 2022

Related U.S. Application Data

(63) Continuation of application No. 16/924,345, filed on Jul. 9, 2020, now Pat. No. 11,386,743, which is a continuation of application No. 16/752,136, filed on Jan. 24, 2020, now Pat. No. 10,726,662, which is a continuation of application No. 15/946,462, filed on Apr. 5, 2018, now Pat. No. 10,573,119.

(51) Int. Cl.
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
CPC ............................. G07F 17/34; G07F 17/3213
See application file for complete search history.

(56) References Cited

U.S. PATENT DOCUMENTS

| | | | |
|---|---|---|---|
| 4,687,981 | A | 8/1987 | Okada |
| 5,839,957 | A | 11/1998 | Schneider |
| 5,938,196 | A | 8/1999 | Antoja |
| 5,938,529 | A | 8/1999 | Rodesch |
| 6,117,010 | A | 9/2000 | Canterbury |
| 6,174,234 | B1 | 1/2001 | Seibert, Jr. |
| 6,251,014 | B1 | 6/2001 | Stockdale |
| 6,394,900 | B1 | 5/2002 | McGlone |

(Continued)

OTHER PUBLICATIONS

Notice of Allowance dated Apr. 17, 2020 for US App. No. 16/752,136 (pp. 1-8).

(Continued)

*Primary Examiner* — Reginald A Renwick
(74) *Attorney, Agent, or Firm* — Armstrong Teasdale LLP

(57) ABSTRACT

A brushless motor system for use with a mechanical reel gaming machine is provided. The brushless motor system includes a reel hub and a reel frame rotationally attached to a center shaft of the reel hub. The brushless motor system also includes a permanent magnet (PM) rotor attached to the reel frame and including a plurality of permanent magnets attached to the PM rotor. The brushless motor system further includes a stator including stator coils attached to the reel hub, the plurality of stator coils are mounted parallel to a surface of the PM rotor at a separation distance. The stator causes the PM rotor to rotate during activation of the stator without direct contact between the stator and the rotor, thereby causing the display of one or more symbols of the plurality of symbols during the wagering game based on the rotation.

20 Claims, 7 Drawing Sheets

(56) References Cited

U.S. PATENT DOCUMENTS

| | | | |
|---|---|---|---|
| 7,278,917 | B2 | 10/2007 | McGlone |
| 2008/0128542 | A1 | 6/2008 | Majima |

OTHER PUBLICATIONS

Notice of Allowance dated May 7, 2020 for U.S. Appl. No. 16/776,836 (pp. 1-8).

Notice of Allowance dated Jun. 10, 2021 for U.S. Appl. No. 16/752,095 (pp. 1-8).

Office Action (Notice of Allowance and Fees Due (PTOL-85)) dated Mar. 10, 2022 for U.S. Appl. No. 16/924,345 (pp. 1-7).

GAMING MACHINE INCLUDING BRUSHLESS MOTOR SYSTEM

CROSS-REFERENCE TO RELATED APPLICATIONS

This application is a continuation application of U.S. patent application Ser. No. 16/924,345, filed Jul. 9, 2020, which is a continuation of U.S. patent application Ser. No. 16/752,136, filed Jan. 24, 2020, and granted as U.S. Pat. No. 10,726,662, which is a continuation of U.S. patent application Ser. No. 15/946,462, filed Apr. 5, 2018, and granted as U.S. Pat. No. 10,573,119, the entire contents and disclosures of which are hereby incorporated by reference in their entirety.

BACKGROUND

The present disclosure relates generally to gaming machines and wagering and, more particularly, to a gaming machine that includes a brushless motor system for improving operations of the gaming machines.

At least some known gaming machines include stepper motors that enable reels of the gaming machines to rotate. The rotating reels are mechanical spinning reels housed inside the machines that are spun and randomly stopped to place images, symbols, or indicia on the reels in alignment to determine payouts. Drive mechanisms for the reels have developed overtime to the point where the rotation and, in particular, the stopped position of the reels is precisely controlled to manage the allocation of payouts. More recently, electronic gaming machines have been used to simulate spinning reels using computer generated graphics and electronics. However notwithstanding the existence of electronic gaming machines, players are still attracted to, and enjoy, gaming machines having mechanical reels. These mechanical reels are typically driven by a stepper motor that enables the reels to move through a series of incremental positions and, in particular, known stop positions. Operation of the stepper motor is controlled using suitable computer processors that determine the sequence and position of the images in the reels when in the stop position and, therefore, outcomes of a game.

Although the use of the stepper motors enables fairly easy control of the position, velocity, and acceleration of the reels, the configuration of the stepper motors' direct drive (e.g., the stepper motor shaft is directly coupled to the reel's center hub) requires the rotational inertia of the reels and the stepper motors to be closely matched. Thus, when the rotational inertia changes (e.g., when the reels' mechanical design changes and/or the reels strip are made of different materials or different motion profile), the reels' rotation algorithms must be reprogrammed. Moreover, the stepper motors' direct drive must be altered with the corresponding steps that the controllers of the stepper motors take to accelerate and decelerate the reels. Therefore, without the proper stepping algorithms, the poles of the stepper motors may slip and the reels lose their position, resulting in a tilt error of the gaming machines. In addition, stepper motors are designed to maximize holding torque by holding the mechanical load at one of the steps. The holding of the mechanical load is accomplished by keeping the winding current high (even though the stepper motors' rotor is aligned with the stepper motors' stator) which wastes a lot of energy because no torque is generated unless the mechanical load tries to turn out of position.

Stepper motors are also disadvantageous because they draw substantial power regardless of load causing low efficiency, their torque drops rapidly with speed (the direction of the torque is inverse of the speed), their accuracy is low (e.g., 1:200 at full load, 1:2000 at light loads), they are prone to resonances (e.g., they require microstepping to move smoothly), they do not provide feedback to indicate missed steps, they have a low torque to inertia ratio that impedes acceleration of loads rapidly, their temperature substantially increases at high performance configurations, they do not "pick up" after momentary overload, they are audibly very noisy at moderate to high speeds, and they generate a low output power compared to their size and weight.

BRIEF DESCRIPTION

In some embodiments, a brushless motor system for use with a mechanical reel gaming machine is provided. The brushless motor system includes a reel and a reel frame rotationally attached to the reel hub. The reel frame is configured to display a plurality of symbols associated with a wagering game provided by the mechanical reel gaming machine. A center of the reel frame is rotationally mounted to a center shaft of the reel hub. The brushless motor system also includes a permanent magnet (PM) rotor fixedly attached to the reel frame. The PM rotor comprises a plurality of permanent magnets attached to a surface of the PM rotor. The brushless motor system further includes a stator comprising a plurality of stator coils fixedly attached to the reel hub, the plurality of stator coils are mounted parallel to a surface of the PM rotor. The stator is coupled to a mounting frame and spaced away from the PM rotor by a separation distance. The stator causes the PM rotor to rotate during activation of the stator without direct contact between the stator and the rotor, thereby causing the display of one or more symbols of the plurality of symbols during the wagering game based on the rotation.

In some other embodiments, a mechanical reel gaming machine is provided. The mechanical reel gaming machine includes a memory a controller, and a brushless motor system. The brushless motor system includes a reel and a reel frame rotationally attached to the reel hub. The reel frame is configured to display a plurality of symbols associated with a wagering game provided by the mechanical reel gaming machine. A center of the reel frame is rotationally mounted to a center shaft of the reel hub. The brushless motor system also includes a permanent magnet (PM) rotor fixedly attached to the reel frame. The PM rotor comprises a plurality of permanent magnets attached to a surface of the PM rotor. The brushless motor system further includes a stator comprising a plurality of stator coils fixedly attached to the reel hub, the plurality of stator coils are mounted parallel to a surface of the PM rotor. The stator is coupled to a mounting frame and spaced away from the PM rotor by a separation distance. The stator causes the PM rotor to rotate during activation of the stator without direct contact between the stator and the rotor, thereby causing the display of one or more symbols of the plurality of symbols during the wagering game based on the rotation.

In yet other embodiments, a method for improving operations of a mechanical reel gaming machine is provided. The method includes rotating a permanent magnet (PM) rotor along a mechanical reel, wherein the PM rotor is mounted on a reel hub, wherein the center of the reel hub is rotationally mounted onto a center shaft, wherein a stator is mounted parallel to a surface of the PM rotor, coupled to a mounting frame, and spaced away from the PM rotor, wherein the PM rotor rotates avoiding contact with the stator.

Still other features, aspects, and advantages of embodiments will become more fully apparent from the following detailed description, the appended claims, and the accompanying drawings illustrating a number of example embodiments and implementations, including the best mode contemplated for carrying out the embodiments. Embodiments may also be capable of other and different applications, and several details may be modified in various respects, all without departing from the spirit and scope of the disclosed embodiments. Accordingly, the drawings and descriptions are to be regarded as illustrative in nature, and not as restrictive. The drawings are not necessarily drawn to scale.

BRIEF DESCRIPTION OF THE DRAWINGS

An example embodiment of the subject matter disclosed will now be described with reference to the accompanying drawings.

DETAILED DESCRIPTION

Figure 1:
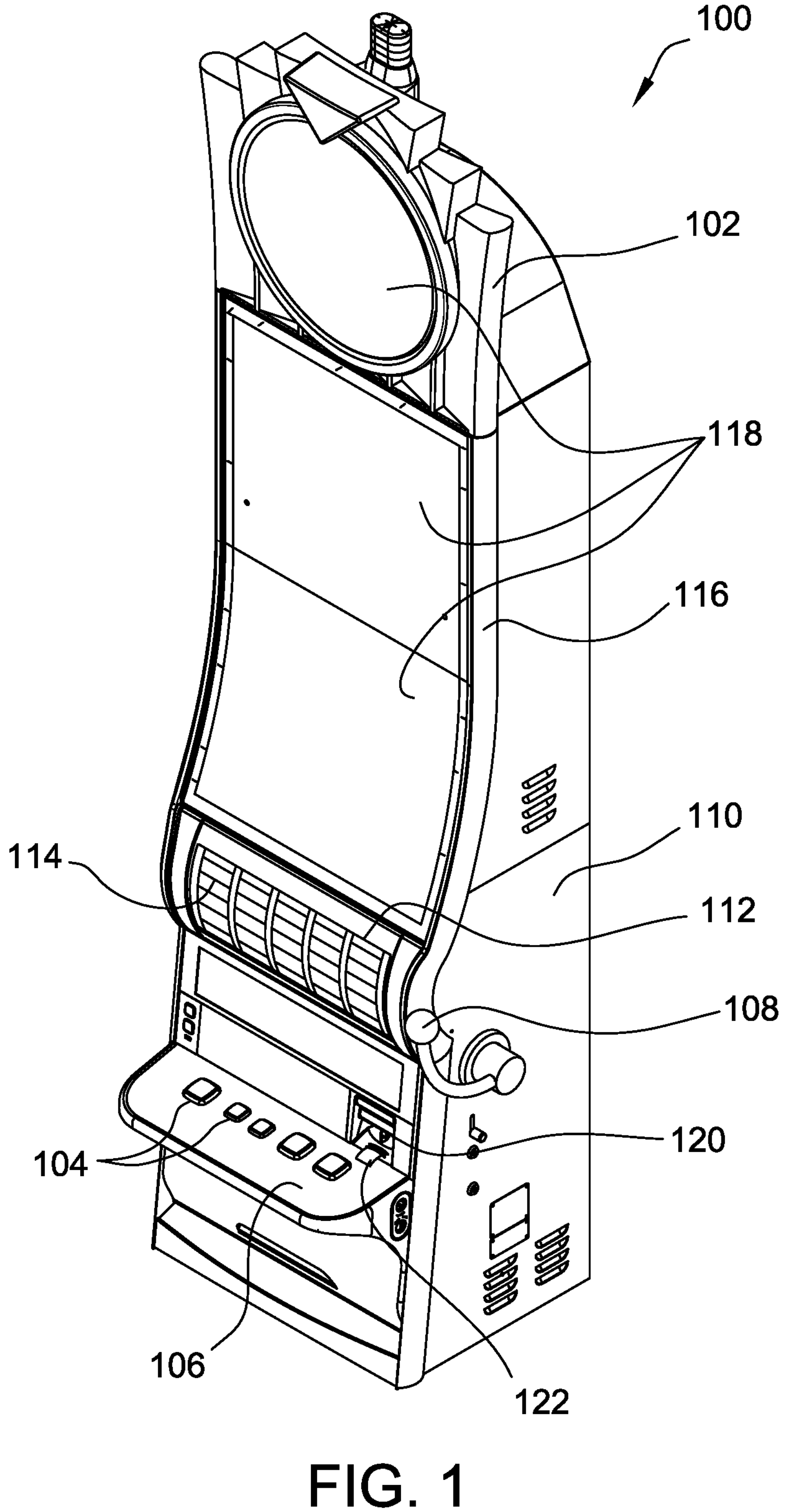
FIG. 1 is a perspective view of an exemplary mechanical reel gaming machine.

The following detailed description illustrates embodiments of the invention by way of example and not by way of limitation. It is contemplated that the invention has general application to gaming machine embodiments providing player comfort and ergonomic considerations in industrial, commercial, and residential applications.

The following description refers to the accompanying drawings, in which, in the absence of a contrary representation, the same numbers in different drawings represent similar elements.

A mechanical reel gaming machine is described herein that includes a brushless motor system for improving operations of the gaming machine. As described herein, the brushless motor system includes, among other components, an inductively-coupled drive mechanism for a mechanical reel that includes a rotor and a stator. The rotor is integrated into the frame of the mechanical reel, and the stator is mounted to a stationary frame of the gaming machine. That is, the brushless motor system is split into two halves: one half resides on the mechanical reel (e.g., the rotor) and one half resides on the frame (e.g., the stator). As such, the inductive coupling between the mechanical reel and the stationary frame allows the brushless motor system to provide various benefits over traditional direct-coupling drive mechanisms used in conventional mechanical reel gaming machines.

More specifically, and for example, the mechanical reel gaming machine and brushless motor system described herein overcomes known drawbacks by, i) providing encoders attached to the rotor of the mechanical reel gaming machine that improve monitoring of the rotor at any given time and controlling of the mechanical reel gaming machine, ii) enabling heavier reel strips and enhancing acceleration and deceleration of the mechanical reel by improving torque, iii) increasing the mechanical reel speed range from a maximum RPM of 400 to a minimum RPM of 1, iv) providing quieter operations of the mechanical reel machines, v) generating maximum torque by operating with the rotor lagging the stator, vi) increasing efficiency by adjusting the amount of current applied that controls torque, vii) facilitating accommodating additional heat of operating the motor at maximum current, viii) decreasing the number of steps per revolution to perform small steps for precise motion control, and ix) increasing responsiveness, quick acceleration, reliability, life span, speed of operation and power density.

With these and other advantages and features of the invention that will become hereinafter apparent, the nature of the invention may be more clearly understood by reference to the following detailed description of the invention, the appended claims and to the several drawings included herein. In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, hardware, and electrical changes may be made without departing from the scope of the present invention. The following description is, therefore, not to be taken in a limited sense, and the scope of the present invention is defined by the appended claims.

The gaming machine illustrated may incorporate many features in addition to those described herein, for example, display units, spinning wheels, and any other interactive medium that may or may not be played in combination with a game being played on the rotating reels.

Terms

Throughout the description that follows and unless otherwise specified, the following terms may include and/or encompass the example meanings provided in this section. These terms and illustrative example meanings are provided to clarify the language selected to describe embodiments of the invention both in the specification and in the appended claims.

The term "game" may refer to a gambling event with a beginning and end that may encompass one or more spins, handle pulls, or span of time. The end of the game may be determined voluntarily (in which the player elects to stop play) or involuntarily (in which the mechanical reel gaming machine terminates play).

The term "primary game" may refer to play resulting from the spinning of standard physical slot reels, the dealing of physical cards, or other game outcomes. For example, the outcome of a primary game might be cherry-cherry-bar or 4 hits on a 7-spot keno ticket.

The term "bonus award" may refer to a secondary game separate from the primary game in which the player typically does not have to wager any additional funds or credits and has the possibility of winning a relatively large payout. It should be understood that in some embodiments, a bonus game may require an additional wager.

The term "handle pull" may refer to a single play at a gaming machine whether or not a handle is involved in the play and whether or not a handle is even included in the gaming machine. The meaning is intended to be flexible in that a single handle pull might constitute a single complete game, or a single wager. For example, a handle pull might represent a single spin of the reels or a series of spins which culminate in a final aggregate outcome.

The term "outcome" may refer to a result of gaming event, such as cherry-cherry-cherry in a slot machine game, a push in blackjack, the completion of a puzzle, the attainment of a goal, etc. Different types of gaming machines may have widely varying types of outcomes. Several are described in detail herein and still others will be apparent to those of skill in the art based on the present disclosure.

The term "payout" may refer to a prize, reward, winnings, or bonus associated with a certain outcome.

The terms "controller" and "computer" shall be synonymous and may refer to an electronic device (e.g., a personal computer) that communicates with one or more gaming machines. In a manner well known in the art, a controller may function as a computer server and may control some of the actions of the gaming machines, or actions associated with or related to such gaming machine(s). A controller may also contain databases to record statistics such as coin-in, coin-out, jackpot information, theoretical wins, etc.

The term "gaming machine controller" may refer to a circuit within a gaming machine that includes a processor that processes game play instructions in accordance with game play rules and outputs game play outcomes to one or more displays. The game play rules may be stored as program code in a memory but can also be hardwired. In some embodiments, the memory may also store data indicative of a plurality of symbols, pay tables, images, and/or other information to be used in games.

The term "processor" when described as part of, or existing within a gaming machine controller, may refer generically to any device that can process game play instructions in accordance with game play rules and may include: a microprocessor, microcontroller, programmable logic device or other computational device, a general purpose computer (e.g. a PC) or a server. That is, a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also known to provide a specific purpose processor using, for example, an application specific integrated circuit (ASIC) or a field programmable gate array (FPGA).

The term "peripheral device" may refer to a device operatively connected (e.g., either physically, wirelessly, and/or logically) to a gaming machine (e.g., more specifically to a gaming machine controller within a gaming machine) that is configured to assist in the operation of game, play, payout, wager and/or player tracking related functions. In some embodiments peripheral devices may be located near players at a table game.

The terms "computer-readable medium" or "computer readable media" as used herein may refer to any media or medium that may participate in providing instructions to a gaming machine (or any other processor of a device described herein) for execution. Such a medium may take many forms, including but not limited to, non-volatile media, volatile media, and/or transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry transitory acoustic or light waves, such as those generated during radio frequency (RF) and infrared (IR) data communications. Common forms of computer-readable media include, for example, a solid state drive, a flash drive, an SD card, a compact flash (CF) card, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

FIG. 1 is a perspective view of an exemplary mechanical reel gaming machine, such as gaming machine 100. In one example, gaming machine 100 randomly generates game outcomes using probability data. For example, each game outcome is associated with one or more probability values that are used by gaming machine 100 to determine the game output to be displayed. Such a random calculation may be provided by a random number generator, such as a true random number generator, a pseudo-random number generator, or any other suitable randomization process.

In this example, gaming machine 100 includes a cabinet 102 configured to house a plurality of components, such as a gaming machine controller, peripheral devices, display devices, and player interaction devices. For example, gaming machine 100 includes a plurality of switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits. Mechanical handle 108 may be coupled to a side of cabinet 102. Mechanical handle 108 may be used to initiate a play of the game of the primary or the secondary game.

Gaming machine 100 also includes a plurality of electromechanical reels 114 on which a plurality of images, symbols, or indicia may be displayed. After a play is initiated (e.g., after mechanical handle 108 initiates the play), electromechanical reels 114 rotate and stop indicating the outcome of the play. Electromechanical reels 114 may be used to play a base or primary game and/or a bonus game. Once electromechanical reels 114 stop, gaming machine 100 may determine a payout based on the alignment of the plurality of images, symbols or indicia of electromechanical reels 114.

Gaming machine 100 further includes a top box 116 that may include one or more display devices 118 for displaying artwork including, for example, pay tables and detail bonus awards and other information and/or images relating to the game. Display devices 118 may include, without limitation, a cathode ray tube (CRT) screen device, a plasma display, a liquid crystal display (LCD), and/or a display based on light emitting diodes (LEDs), organic light emitting diodes (OLEDs), polymer light emitting diodes (PLEDs), and/or surface-conduction electron emitters (SEDs).

Gaming machine 100 may include electromechanical reels 114 and a surrounding border or background, for example. A transmissive display may be used that overlays around all or part of the game display area of electromechanical reels 114. Video displays (e.g., LCD, CRT, plasma, or the like) and/or other illuminating or light sources (e.g., lamps, light emitting diodes (LEDs), or the like) may also be integrated with the electro-mechanical reels to illuminate or animate desired display locations such as pay lines, pay combinations, winning lines, winning combinations, special symbols, and other location that may be desired to be illuminated.

Lighting may also be used to backlight symbols and/or generating a flickering or flashing effect as electromechanical reels 114 spin, for example. One or more light sources may be used with one or more filters to adjust certain characteristics of light emitted by the one or more light sources (e.g., altering lamp light to simulate natural daylight).

Moreover, gaming machine 100 includes an input/output (I/O) device 120 coupled to front 106 for accepting and/or validating cash bills and/or tickets or vouchers 122, I/O device 120 may also be capable of printing and/or reading tickets 122 as is described in greater detail below. Furthermore, I/O device 120 may include a card reader or validator for use with credit cards, debit cards, identification cards, and/or smart cards. The cards accepted by I/O device 120 may include a magnetic strip and/or a preprogrammed microchip that includes a player's identification, credit totals, and any other relevant information that may be used. For example, as described below, credits may be transferred from one gaming machine 100 directly to another gaming machine 100 without an intervening server. Alternatively, credits may be transferred from gaming machine 100 to and/or from another device capable of reading and/or outputting a coded tangible medium, such as a barcode on voucher 122 or a radio frequency identification (RFID) chip. Such devices may include, but are not limited to, kiosks, bar top games, point-of-sale (POS) devices, and the like. The credit transfer is based on a verification routine in which a receiving device reads a code from a tangible medium and determines an originating device that output the tangible medium. The receiving device directly contacts the originating device, and the originating device determines a number of credits available to the user or player. The originating device then provides verification to the receiving device and the credits are applied to, for example, a credit display for use by the user or player.

Figure 2:
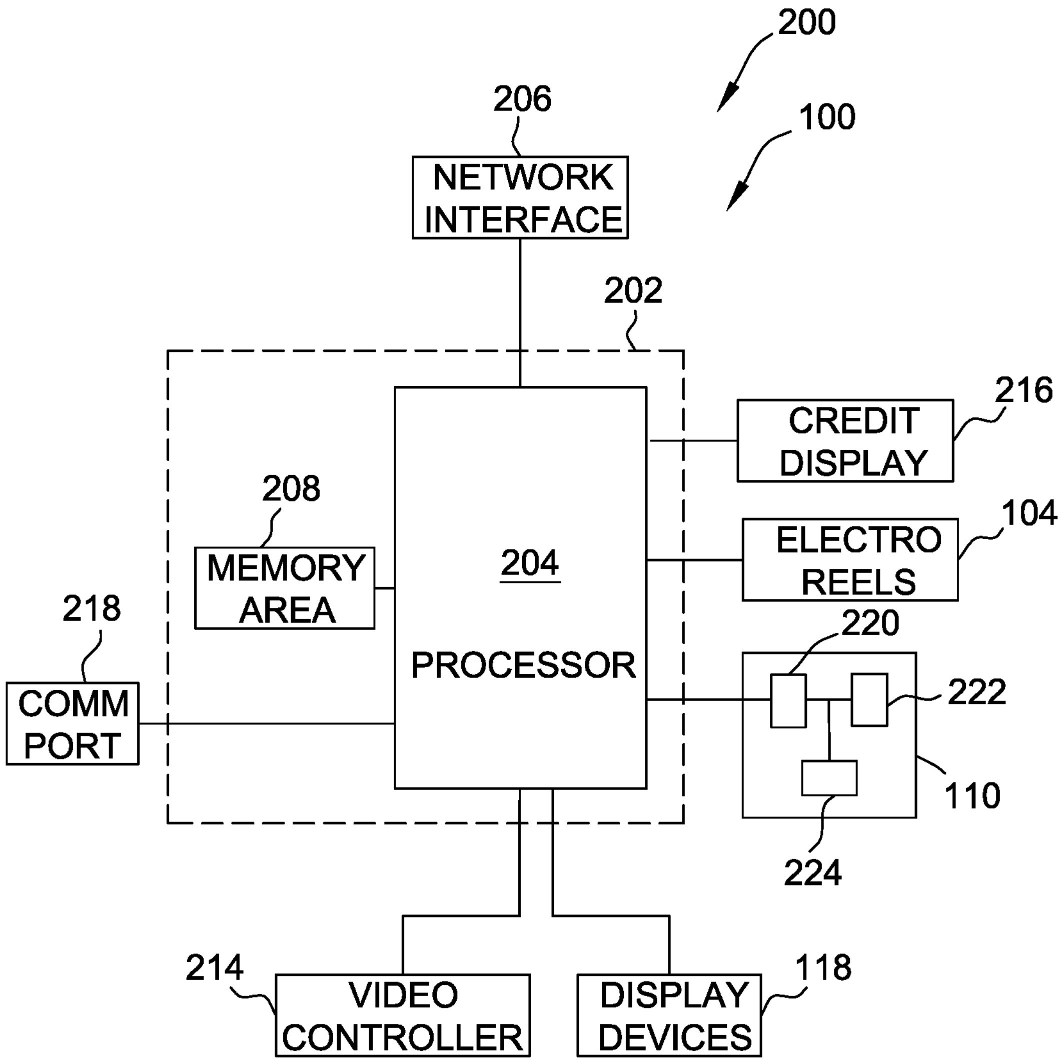
FIG. 2 is a block diagram of an exemplary electrical architecture that may be used with the gaming machine shown in FIG. 1.

FIG. 2 is a block diagram of an exemplary electrical architecture 200 that may be used with gaming machine 100 (shown in FIG. 1). In this example, gaming machine 100 includes a gaming machine controller 202, or controller board, having at least one processor 204, such as a microprocessor, a microcontroller-based platform, a suitable integrated circuit or one or more application-specific integrated circuits. Processor 204 communicates with one or more other gaming machines 100 or other suitable devices via a network interface 206. Moreover, processor 204 is communicatively coupled to at least one data storage or memory area 208. In the exemplary embodiment, processor 204 and memory area 208 are located within cabinet 102 (shown in FIG. 1). Memory area 208 stores program code and instructions that are executable by processor 204 to control gaming machine 100. For example, processor 204 controls one or more plays on gaming machine 100. Memory area 208 also stores other data such as image data, event data, player tracking data, accounting data, pay table data, and/or other information or applicable game rules that relate to game play at gaming machine 100. Memory area 208 may include one or more forms of memory. For example, memory area 208 can include random access memory (RAM), read-only memory (ROM), flash memory, and/or electrically-erasable programmable read-only memory (EEPROM). However, any other suitable magnetic, optical, and/or semiconductor memory architecture, by itself or in combination, may be included in memory area 208.

Moreover, electromechanical reels 114 and display devices 118 are controlled by controller 202. Gaming machine 100 also includes a credit display 216 for displaying a player's current number of credits, cash, or account balance. Credit display 216 may be separated into, for example, a number of currently available credits for wagering or for use in purchasing goods or services, and a number of credits selected to wager on a game. Credit display 216 may be integrated into display devices 118 or an independent display.

Furthermore, gaming machine 100 includes one or more communication ports 218 that enable controller 202 to communicate with external peripheral devices (not shown) such as, but not limited to, external video sources, expansion buses, game or other displays, a SCSI port, a serial port, a USB port, or a key pad. Communication port 218 may enable communication between I/O device 120 and controller 202.

In this example, I/O device 120 includes a communication interface 220, a processor 222, and a memory area 224. Memory area 224 stores program code and instructions that are executable by processor 222 to control I/O device 120. Memory area 224 also stores other data such as unique identifiers for I/O device 120 and other I/O devices on the network and/or unique voucher identifiers associated with vouchers or tangible media output by I/O device 120. Memory area 224 may include one or more forms of memory. For example, memory area 224 can include RAM, ROM, flash memory, and/or EEPROM. However, any other suitable magnetic, optical, and/or semiconductor memory architecture, by itself or in combination, may be included in memory area 208. Controller 202 may include one or more of the above-described elements. For example, controller 202 may include processor 204, memory area 208, video controller 214, and network interface 206.

Figure 3:
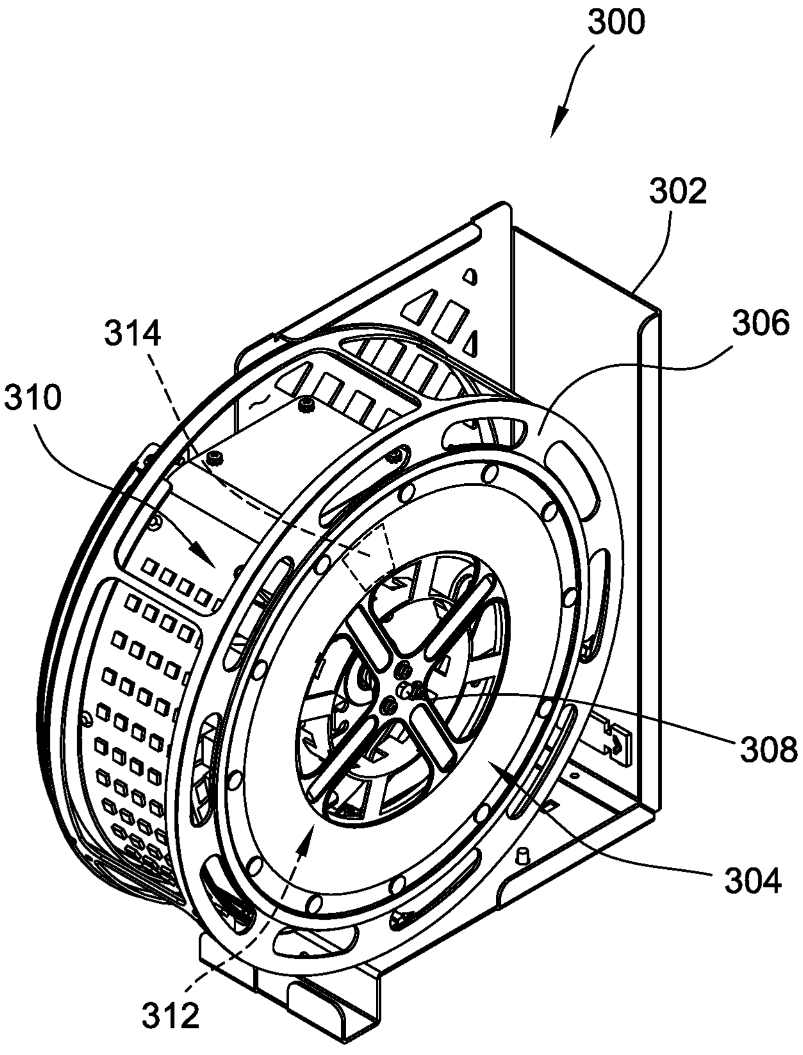
FIG. 3 is a perspective view of an exemplary brushless motor system that may be included in a mechanical reel gaming machine such as the gaming machine shown in FIG. 1.

FIG. 3 is a perspective view of a brushless motor system 300 that may be included in a mechanical reel gaming machine such as gaming machine 100 (shown in FIG. 1). Brushless motor system 300 includes a reel frame 302, a permanent magnet (PM) rotor 304, a reel 306 (e.g., a mechanical reel), a center shaft 308, a reel hub 310 of reel 306, and a stator 312. As described herein, a reel hub (e.g., as reel hub 310) is the volume inside a reel (e.g., reel 306). In the example embodiment, PM rotor 304 is mounted on reel hub 310 and rotates along with reel 306. PM rotor 304 includes magnets 314 placed on an inner wall of PM rotor 304. The center of reel hub 310 is rotationally mounted onto center shaft 308. Center shaft 308 is coupled to reel frame 302. Stator 312 is mounted parallel to the surface of PM rotor 304, with a separation distance between stator 312 and PM rotor 304 of about 1 millimeter to 5 millimeters. PM rotor 304 and reel 306 are decoupled from stator 312 to isolate vibrations generated by stator 312. Additionally, reel 306 and reel frame 302 are separated by an air gap between 0.5 millimeters and 5 millimeters. Having stator 312 coupled to reel frame 302 and PM rotor 304 mounted on reel hub 310 causes an electromagnetic coupling between reel 306 and reel frame 302 during operation. That is, brushless motor system 300 uses the electromagnetic coupling between PM rotor 304 and stator 312 to provide rotational torque to reel 306, thereby controlling rotation of the reel 306. The electromagnetic coupling acts to absorb vibrations generated by stator 312 due to the absence of physical contact between PM rotor 304 and stator 312, and thus between reel 306 and reel frame 302. Reel 306 and reel frame 302 are bound together by an electromagnetic field instead of a physical set-screw on reel hub 310 to center shaft 308 coupled to stator 312.

In some embodiments, a driver circuit (not shown) of stator 312 applies an electrical current, in sequence, across a plurality of stator coils (e.g., copper coils, not shown in FIG. 3), arranged circumferentially and equidistant with respect to center shaft 308. Current through the stator coils produces a rotational electromagnetic field that inductively couples to magnets 314 of reel 306 and causes reel 306 to rotate. In some embodiments, the driver circuit of stator 312 applies the electric current in response to instructions received from controller 202 (shown in FIG. 2). The electric current causes reel 306 to rotate, as described above. During operation, the driver circuit of stator 312 applies the electric current to a predetermined level, based on the instructions received from controller 202, that causes reel 306 to rotate for a period of time (e.g., a predetermined or a random period of time). Once reel 306 ceases to rotate, images, symbols, or indicia on the reel 306 are aligned. Based on the alignment of images, symbols, or indicia, controller 202 determines whether the outcome corresponds to a payout and, if so, controller 202 determines the type of payout.

Figure 4:
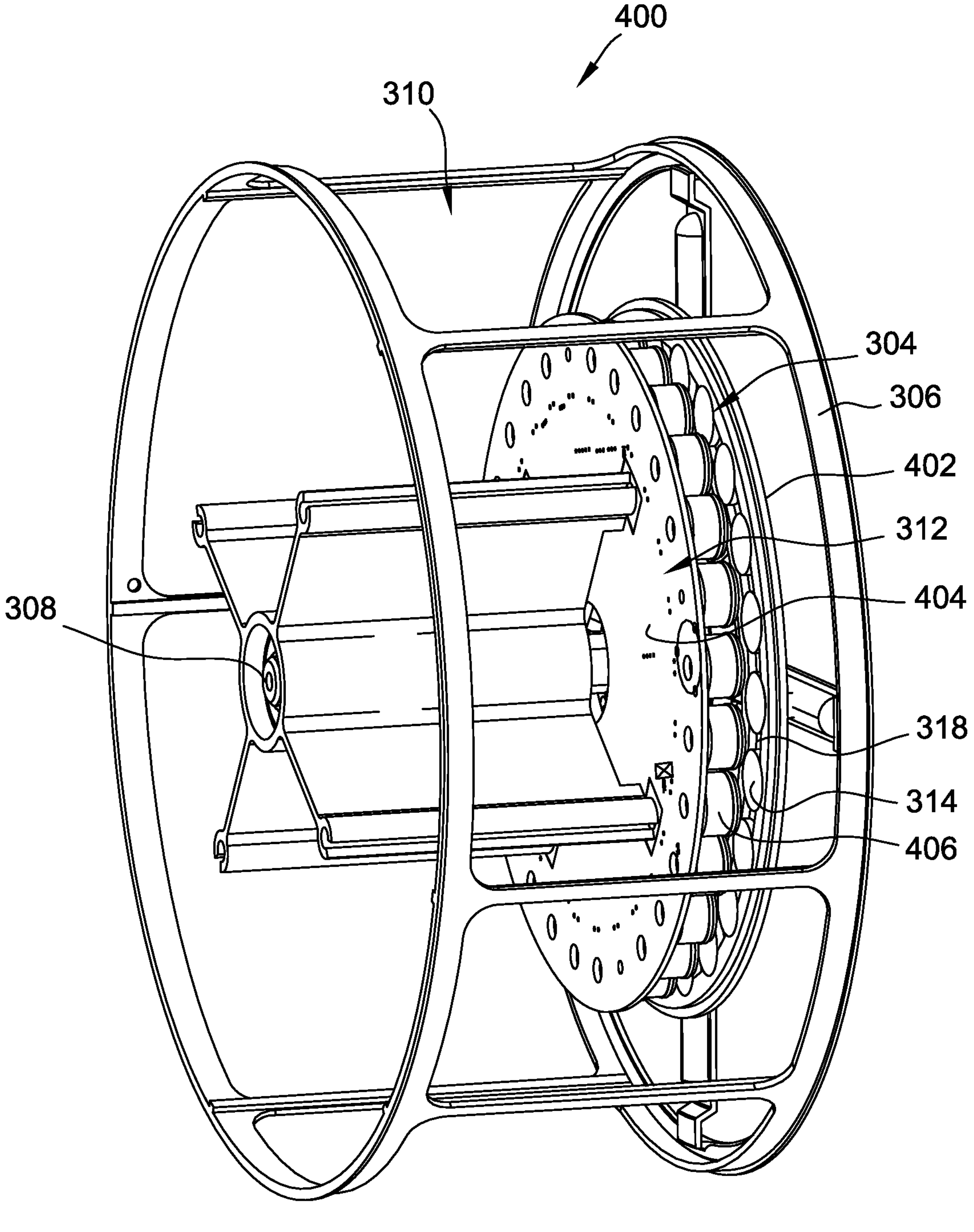
FIG. 4 is a perspective view of an exemplary slot reel split-motor drive that may be included in the brushless motor system shown in FIG. 3.

FIG. 4 is a perspective view of a slot reel split-motor drive 400 that may be included in brushless motor system 300 (shown in FIG. 3). Slot reel split-motor drive 400 includes PM rotor 304, reel 306, center shaft 308, reel hub 310, stator 312, magnets 314, and encoders 316. In the example embodiment, PM rotor 304 is mounted on reel hub 310 and rotates along with reel 306. Magnets 314 are coupled to PM rotor 304 and are placed on the inner wall of PM rotor 304. The center of reel hub 310 is rotationally mounted onto center shaft 308. Center shaft 308 may be coupled to a reel frame (not shown), such as reel frame 302 (shown in FIG. 3). Stator 312 is mounted parallel to the surface of PM rotor 304, separated by a distance of about 1 millimeter to 5 millimeters. Reel 306 and, more particularly, PM rotor 304 are decoupled from stator 312 to isolate vibrations generated by stator 312. More specifically, reel 306 and reel frame 302 are separated by an air gap between 0.5 millimeters and 5 millimeters. Having stator 312 coupled to reel frame 302 and PM rotor 304 mounted on reel hub 310 causes an electromagnetic coupling between reel 306 and reel frame 302. That is, slot reel split-motor drive 400 uses the electromagnetic coupling between PM rotor 304 and stator 312. The electromagnetic coupling absorbs the vibrations generated by stator 312 due to the absence of physical contact between PM rotor 304 and stator 312, and thus between reel 306 and reel frame 302. Reel 306 and reel frame 302 are bound together by an electromagnetic field instead of a physical set-screw on reel hub 310 to center shaft 308 coupled to stator 312.

In the example embodiment shown in FIG. 4, stator 312 includes stator coils 406 disposed circumferentially about a frame iron cap plate 404 and equidistant from center shaft 308. Further, stator coils 406 subtends through the entire circumference of reel hub 310 (e.g., through 360 degrees arc). In other embodiments, stator 312 may be a partial stator, subtending through less than the entire circumference of reel hub 310. For example, stator 312 may subtend through 90 degrees or 180 degrees arc. Partial stator embodiments may provide various benefits. For example, a partial stator may be less expensive, lighter, and easier to access and maintain compared to stators that subtend a complete 360 degrees. Complete stator embodiments may provide benefits such as, for example, fewer issues with warping and greater control over heavier reels. In some embodiments, brushless motor system 300 may include multiple stators 312. For example, brushless motor system 300 may include two 90 degree stators symmetrically arranged 90 degrees apart or four 45 degree stators arranged 45 degrees apart (e.g., to balance drive torque). In some embodiments, brushless motor system 300 may include an odd number of stators 312 (e.g., for self-starting).

Figure 5:
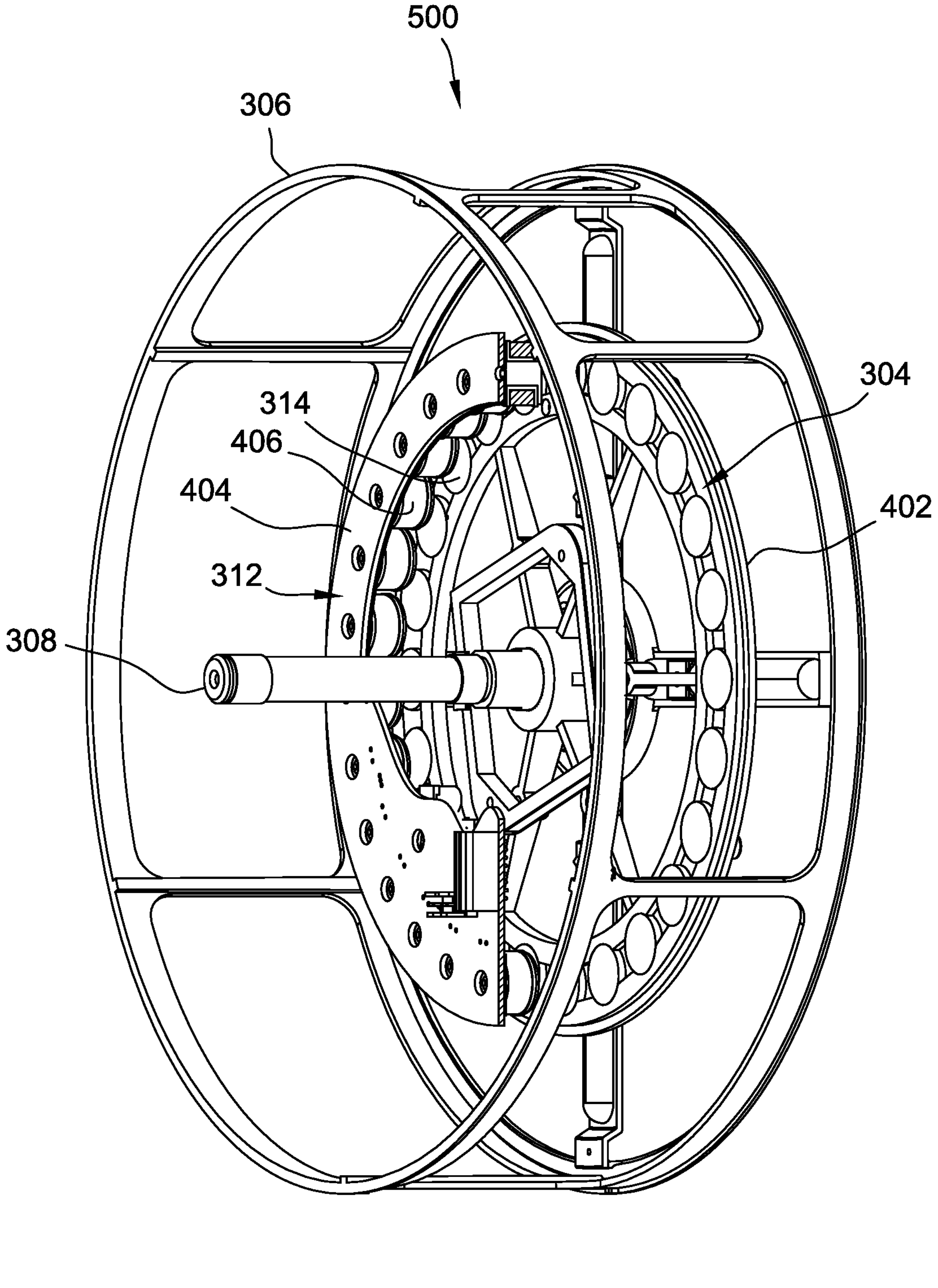
FIG. 5 is a partial cross-sectional view of a slot reel split-motor drive, similar to the slot reel split-motor drive shown in FIG. 4, that may be included in the brushless motor system shown in FIG. 3.

FIG. 5 is a partial cross-sectional view of a slot reel split-motor drive 500, similar to slot reel split-motor drive 400 (shown in FIG. 4), that may be included in brushless motor system 300 (shown in FIG. 3). Split-motor drive 500 includes PM rotor 304, reel 306, shaft 308, stator 312, magnets 314 (e.g., stator coils), side iron cap plate 502, frame iron cap plate 504, and. Portions of some components in are not shown in FIG. 5 for purposes of illustration. More specifically, and for example, stator 312 is only shown through 180 degrees of arc (e.g., to better illustrate aspects of rotor 304), and an interior portion of frame iron cap plate 404 is not shown (e.g., to better illustrate stator coils 406). Aspects of implementation of stator 312 may depend on the size or inertia of reel 306 and/or addition of features (e.g., an LCD screen) within slot reel split-motor drive 500. For example, if a curved LCD screen is included, the circumference of stator 312 is less than 360 degrees (e.g., as shown in FIG. 5) so that the curved LCD screen may be placed within slot reel split-motor drive 500.

Figure 6:
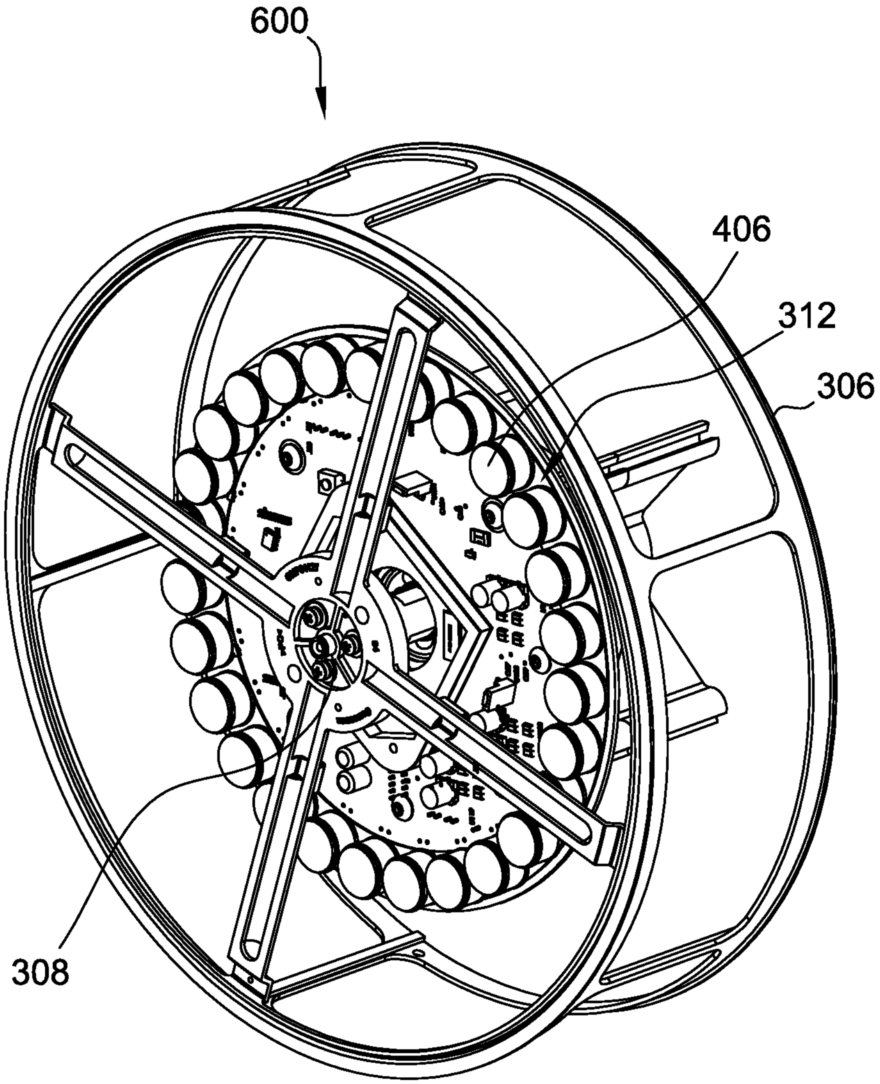
FIG. 6 is a simplified alternate perspective view of a slot reel split-motor drive, similar to the slot reel split-motor drive shown in FIG. 4, that may be included in the brushless motor system shown in FIG. 3.

FIG. 6 is a simplified alternate perspective view of a slot reel split-motor drive 600, similar to slot reel split-motor drive 400 (shown in FIG. 4), that may be included in brushless motor system 300 (shown in FIG. 3). Split-motor drive 600 includes center shaft 308, stator 312, and magnets 314. Portions of some components in are not shown in FIG. 6 for purposes of illustration. More specifically, and for example, rotor 304 is not shown (e.g., to better illustrate aspects of stator 312 and stator coils 406). In the exemplary embodiment, stator 312 subtends 360 degrees as there are no additional features (e.g., an LCD screen) within reel 306.

Figure 7:
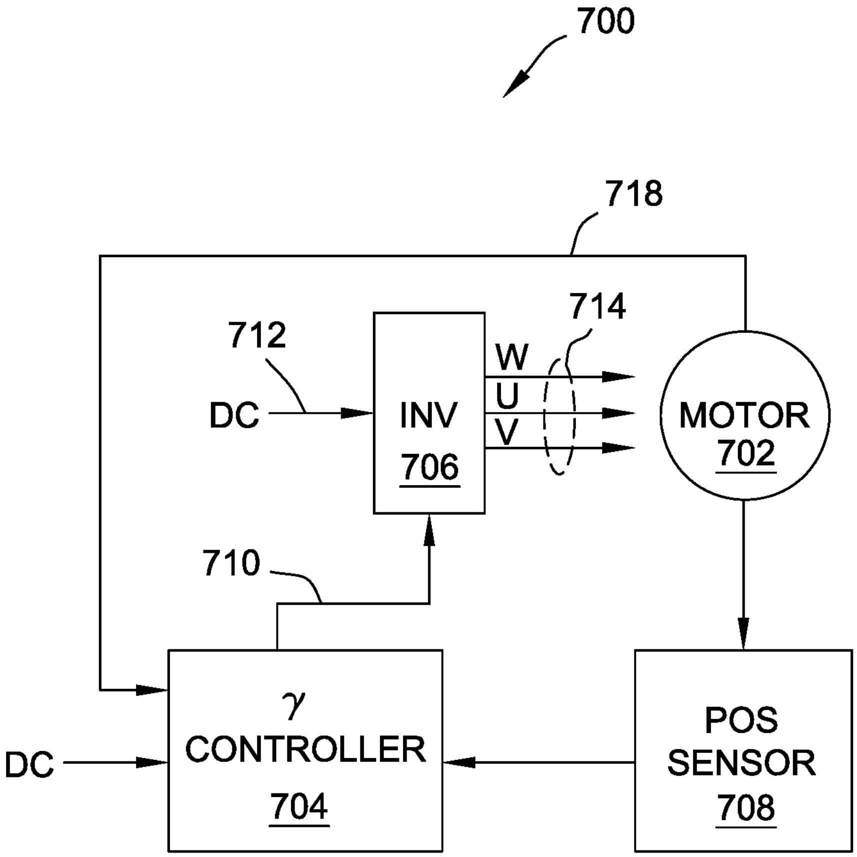
FIG. 7 is a block diagram of an exemplary drive circuit that may be used with the mechanical reel gaming machine shown in FIG. 1 and/or the brushless motor system shown in FIG. 3.

FIG. 7 is a block diagram of an exemplary drive circuit 700 for a motor 702. Motor 702 includes a rotor and a stator, such as PM rotor 304 and stator 312, respectively (both shown in FIG. 3). Motor 702 is coupled to drive circuit 700. Drive circuit 700 includes a microcontroller 704, an inverter 706, and position sensors 708.

Microcontroller 704 executes a control algorithm, such as, for example, a vector control algorithm, for controlling inverter 706. More specifically, microcontroller 704 transmits one or more pulse width modulation (PWM) signals 710 to inverter 706 to control the operation of various switches and power electronics (not shown) within inverter

706. Inverter 706, during operation, converts an input power 712, such as, for example, a DC power or an AC rectified power, to three-phase power for energizing motor 702. In such an embodiment, microcontroller 704 may transmit PWM signal 710 for each phase of inverter 706 to generate three phases of output power (W, U, V). Microcontroller 704 generates a given PWM signal 710 based on stator current measurements collected by position sensors 708. Stator current measurements for each phase of motor 702 may be determined based on positon sensors 708 coupled to various portions of drive circuit 700, including, for example, within inverter 706, collective measurements 714 at the output of inverter 706, or any combination thereof.

Microcontroller 704 is further configured to generate a given PWM signal 710 based on rotor position of motor 702. Drive circuit 700 receives rotor speed measurements 718 from motor 702. Rotor speed measurements 718 may be integrated over time to determine a rotor position. Rotor speed may be measured by sensors (not shown) coupled to motor 702. In certain embodiments, rotor speed is derived from the output frequency of three-phase power (W, U, V) of inverter 706. In alternative embodiments, rotor position is measured directly. In other embodiments, microcontroller 704 executes a position-sensorless vector control algorithm.

Exemplary embodiments of systems, methods, and apparatus for improving operations of gaming machines are described above in detail. The systems, methods, and apparatus not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A microcontroller or controller board, such as those described herein, includes at least one processor or processing unit and a system memory. The microcontroller or controller board typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary gaming system environment, embodiments of the invention are operational with numerous other general purpose or special purpose gaming system environments or configurations. The gaming system environment is not intended to suggest any limitation as to the scope of use or functionality of any aspect of the invention. Moreover, the gaming system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California).

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor system for use with a mechanical reel gaming machine, the motor system comprising:

a rotor comprising a plurality of permanent magnets, the rotor being rotatable about a rotational axis;

a reel coupled to the rotor for displaying symbols associated with a game; and a stator configured to be coupled to a frame of the gaming machine, the stator being axially spaced from the rotor, wherein the stator causes the rotor to rotate when activated, thereby causing the reel to rotate.

2. The motor system in accordance with claim 1, wherein the rotor comprises a rotor surface oriented to face the stator, wherein the plurality of permanent magnets are coupled to the rotor surface.

3. The motor system in accordance with claim 2, wherein the stator comprises a plurality of stator coils fixably mounted in parallel to the rotor surface.

4. The motor system in accordance with claim 3, wherein the plurality of permanent magnets are mounted circumferentially about the rotor surface at a first radial distance from the rotational axis.

5. The motor system in accordance with claim 4, wherein the plurality of stator coils are mounted on a surface of the stator at a second radial distance approximately equal to the first radial distance.

6. The motor system in accordance with claim 5, wherein the plurality of stator coils extend axially outward from the surface of the stator towards the rotor.

7. The motor system in accordance with claim 1, wherein the stator is spaced a distance from the rotor that is between one millimeter and five millimeters.

8. The motor system in accordance with claim 1 further comprising a controller electrically coupled to the stator, the controller comprising a processor configured to execute instructions stored in a memory, which, when executed by the processor, cause the processor to control the stator based on at least one of a position of the rotor and a current measurement of the stator.

9. The motor system in accordance with claim 1, wherein the stator comprises a plurality of stator coils, and wherein the plurality of permanent magnets and the plurality of stator coils cause the rotor and the stator to be magnetically coupled during activation of the stator.

10. The motor system in accordance with claim 1, wherein the reel is coupled in direct contact with the rotor.

11. The motor system in accordance with claim 10, wherein, when coupled to the frame of the gaming machine, the reel and the frame are separated by a separation distance between 0.5 millimeters and 5.0 millimeters.

12. The motor system in accordance with claim 1, wherein the motor system is a brushless axial flux motor.

13. A mechanical reel gaming machine comprising:

a memory;

a controller;

a mounting frame; and a brushless motor system comprising:

a rotor comprising a plurality of permanent magnets, the rotor being rotatable about a rotational axis;

a reel coupled to the rotor for displaying one or more symbols associated with a game; and a stator coupled to the mounting frame, the stator being axially spaced from the rotor, wherein the stator causes the rotor to rotate when activated, thereby causing the reel to rotate.

14. The mechanical reel gaming machine in accordance with claim 13, wherein the rotor is in direct contact with the reel.

15. The mechanical reel gaming machine in accordance with claim 13, wherein the brushless motor system further comprises a motor controller electrically coupled to the stator, the motor controller configured to control the stator based on at least one of a position of the rotor and a current measurement of the stator.

16. The mechanical reel gaming machine in accordance with claim 13, wherein the rotor comprises a rotor surface oriented to face the stator, the plurality of permanent magnets being coupled to the rotor surface.

17. The mechanical reel gaming machine in accordance with claim 16, wherein the stator comprises a plurality of stator coils fixably mounted in parallel to the rotor surface.

18. The mechanical reel gaming machine in accordance with claim 17, wherein the plurality of permanent magnets are mounted circumferentially about the rotor surface at a first radial distance from an axis of rotation of the rotor.

19. The mechanical reel gaming machine in accordance with claim 18, wherein the plurality of stator coils are mounted on a surface of the stator at a second radial distance approximately equal to the first radial distance.

20. A method for assembling a mechanical reel gaming machine comprising:

coupling a stator to a reel frame;

rotatably coupling a rotor to the reel frame, the rotor including a plurality of permanent magnets and being rotatable about a rotational axis, the stator being axially spaced from the rotor; and coupling a reel to the rotor, the reel being configured to display symbols for a game played on the gaming machine, wherein the stator is configured to cause the rotor to rotate when activated, thereby causing the reel to rotate.

* * * * *